United States Patent Office 3,325,553
Patented June 13, 1967

3,325,553
ISOMERIZATION OF ALPHA-PINENE
John Mentzer Derfer, P.O. Box 389,
Jacksonville, Fla. 32201
No Drawing. Filed Aug. 12, 1965, Ser. No. 479,275
5 Claims. (Cl. 260—675.5)

This application is a continuation-in-part of a copending application, entitled, "Alpha Pinene Isomerization Process and Product," filed Feb. 19, 1964, Ser. No. 345,934, now Patent No. 3,278,623, which is hereby incorporated by reference.

The present invention relates to the substantially nondestructive catalytic isomerization of alpha-pinene to economically recoverable beta-pinene and, more particularly, to improvements in pretreating the alpha-pinene supply to inhibit subsequent poisoning of the catalyst during isomerization.

The use of sodium and a Group VIII metal, as hereinafter described, in the presence of hydrogen for sweetening a sour α-pinene supply forms the subject matter of related continuation-in-part applications.

As described in the cited copending application, Ser. No. 345,934, now Patent No. 3,278,623, naturally-occurring beta-pinene has been isolated from certain alpha-pinene-rich turpentines, for example, gum and sulfate turpentine from U.S. sources. Beta pinene is useful as a raw material for producing terpene resins, myrcene and nopol (6,6-dimethyl bicyclo (3,1,1)-heptene-2 ethanol) regardless of its optical configuration, and is particularly valuable as a raw material in the synthesis of fine chemicals such as l-menthol and d-citronellol when such pinene has high optical activity (laevo rotation).

Alpha pinene is much more abundant than beta pinene, but the alpha isomer has been less valuable as a starting material for chemical syntheses. Alpha pinene is available from virtually all world turpentine supplies, typically gum, wood and sulfate turpentine in the United States and from many foreign turpentines. Accordingly, there has been interest in converting alpha-pinene to beta-pinene for a number of years, but the prospects for economic commercial operation heretofore have been slight.

Prior attempts to obtain beta-pinene have not been of commercial value because of the high proportions of undesirable by-products which hinder significantly a ready separation of alpha-pinene from beta-pinene and a resulting economic recovery of beta-pinene in high purity. The invention described and claimed in the parent Patent No. 3,278,623 for the first time makes possible the economic recovery of beta-pinene from a substantially nondestructive catalytic isomerization of alpha-pinene. Broadly, the process of the parent application comprises establishing vapor or liquid phase contact between an alpha-pinene supply and a transitory hydrogen acceptor catalyst under neutral to basic conditions in a reaction zone maintained at a temperature within a range of about room temperature to about 300° C., and withdrawing from the reaction zone a novel isomerizate enriched in beta-pinene.

While the process of the parent application is, as indicated, the first successful, economic, commercial source of beta-pinene by catalytic isomerization, it has been noted that the alpha-pinene supply tends to poison many catalysts employed, especially a preferred noble metal catalyst, palladium, and is deleterious to catalyst activity. The poisoning of the catalysts is due to the presence of several contaminants in the supply. While the principal offender appears to be chemically combined sulfur, still other ingredients poison the catalysts, such as certain organic chlorides, for example, those introduced by hypochlorite treatment of pinene, although other chlorides such as bornyl chloride and geranyl chloride have not been particularly harmful. As used here and in the claims, "pretending" the alpha-pinene supply is intended to include the inhibition of one or all of such offending ingredients in the alpha-pinene supply from having such undesirable poisoning effect on an isomerization catalyst.

In particular, one pretreatment of an alpha-pinene supply containing catalyst poisons in accordance with the present invention comprises treating the alpha-pinene with elemental metallic sodium, preferably having an extended surface area. This use is further unique in that the high surface sodium can also be used as the catalyst in the ensuing isomerization reaction, thereby increasing the efficiency of the overall operation. The extended surface area of the metallic sodium catalyst also affords highly desirable results for the isomerization reaction itself.

Another pretreatment operation involves treating the alpha-pinene with an alkali metal hypochlorite, such as potassium, lithium, or sodium hypochlorite. Preferably, the hypochlorite treatment is carried out in the presence of an emulsifier, the combination of the hypochlorite and emulsifier substantially shortening the time required for this pretreatment. A relatively weak emulsification is best since this facilitates "breaking" the emulsion and further shortens the time for pretreatment.

Still further pretreatment operations of the present invention comprise treating the alpha-pinene supply with zinc, or zinc oxide, or with hydrogen in the presence of a metal from Group VIII of the Periodic Table of the Elements, having an atomic number from 28 to 78.

The prime alpha-pinene supply which may be used is a pure or virtually pure alpha-pinene. However, the usual commercial grade of alpha-pinene distillate contains a percent or two of camphene as an indigenous impurity; such grade is economical and quite suitable for my purposes. Additionally, because beta-pinene customarily is recovered by fractional distillation of sulfate or gum turpentine, one could use turpentine directly as the alpha-pinene supply, for example, by feeding it into a distillation unit and obtaining primarily alpha-pinene as an overhead distillate as the pinene supply for the isomerization reaction, while accumulating a bottoms product of beta-pinene, dipentene, oxygenated materials and sesquiterpenes, e.g., anethole, caryophyllene, and methyl chavicol. The bottoms product could then be fractionated to recover beta-pinene and the other high-boiling components. The pinene supply is, for all practical purposes, anhydrous.

As indicated, if many alpha-pinene supplies are used in an untreated form for the isomerization step, the catalyst life is quite short.

In general, an alpha-pinene supply is considered to require pretreatment if, when contacted by a one percent catalyst of 0.5 percent palladium on alumina for 0.5 hour at atmospheric reflux temperature, there is an increase of beta-pinene in the supply of less than 4.5 percent.

The efficiency of the isomerization operation could, therefore, be substantially increased if catalyst poisoning were appreciably reduced or eliminated. Normally, the chief catalyst poisoner found in the alpha-pinene is sulfur which can be present in several chemically combined forms. However, still other compounds are known to be present in the alpha-pinene supply which poison the catalyst, such as the certain organic chlorides previously noted.

Referring to the pretreatment techniques of the present invention in greater detail, elemental metallic sodium is preferably used in a physical form having an extended surface area. Since sodium in this form can also be used as the isomerization catalyst, the following remarks concerning high surface sodium are applicable to its use as pretreating agent and/or to its use as an isomerization catalyst. In either case, the high surface sodium can be used in conjunction with an inert medium which, in turn, can be either a solid or liquid carrier.

The solid carriers are used for vapor phase treatment of the alpha-pinene and may comprise such materials as charcoal, alumina, calcium carbonate, sodium carbonate, asbestos, dolomite, thoria, and the like, all of high surface area over which sodium is applied as a film approaching collodial dimensions. The manner of preparing high surface sodium is known in the art and may be accomplished simply by mixing molten sodium with the suitable inert solid medium. At temperatures above its melting point (97.5° C.), sodium easily spreads over such solids, and the sodium films produced approach atomic dimension in thickness. The effective surface area of the solid inert support determines the amount of sodium adsorbed. Normally, the amount of adsorbed sodium may range from an absolute minimum required to promote pretreatment or a catalytic action to as much as 30 percent by weight of the inert carrier. However, the usual amount is about ten percent, higher percentages usually resulting in a rather pasty mixture which reduces some of the advantages to be gained from sodium of extended surface area.

When the inert medium is liquid, sodium in the form of fine particles is admixed therewith to form a dispersion. About 0.25 percent to about 1.0 percent of a dispersing aid can be used if desired. Such aids include carbon black, calcium stearate, aluminum laurate, lecithin, zinc stearate, and the like. A number of liquid hydrocarbons performed satisfactorily as media for dispersed sodium particles. The inert medium should not, of course, interfere with the pretreatment or isomerization reaction in any way. The liquid inert medium is usually an aromatic or aliphatic hydrocarbon, such as the following, the temperatures in parentheses being representative boiling ranges in degrees centigrade: toluene (110–111), isooctane (97–99), light naphtha (103–163), petroleum ether (107–200), n-octane (125–126), xylene (137–140), n-butyl ether (140–144), Stoddard solvent (155–204), mineral spirits (170–195), refined kerosene (182–271), naphthalene (215–220), whiteoil (287–515), tricresyl phosphate, and the like. It will be noted that preferably the liquid inert medium has a boiling point above the melting point of metallic sodium, 97.5° C.

Sodium dispersions are stable and normally prepared at a temperature slightly above the melting point of sodium, although the dispersions once prepared can be used either above or below the preparation temperature. The fluidity of a sodium dispersion in liquid carriers of the type herein described is usually only slightly less than that of the dispersing medium. A liquid carrier may contain from about 30 percent to about 50 percent by weight of sodium particles which may have a size within the range of one to 20 microns in diameter.

Whether sodium is to be used as a pretreating agent or as an isomerization catalyst, either form previously described (with a solid or liquid carrier) can be used. Similarly, the alpha-pinene may be treated while it is in either a liquid or vapor phase.

In general, when the alpha-pinene is in the liquid phase and sodium of extended surface area coating an inert solid carrier is used in the form previously described, the carrier is merely admixed with the liquid alpha-pinene. It is within the contemplation of the present invention to use sodium particles or comminuted pellets, that is, without an inert solid carrier, although this practice cannot provide the advantages of having sodium in the desired physical form of an extended surface area. In short, fine particles of sodium can be dispersed within the alpha-pinene supply itself without initially forming either a film of sodium or an inert solid carrier, or a dispersion of sodium in an inert liquid medium, as previously described. It is also intended that a liquid dispersion of sodium (using any of the dispersing vehicles previously disclosed) can be directly admixed, as by stirring, into an alpha-pinene supply to be pretreated. The inert liquid carrier can subsequently be separated from the treated alpha-pinene by a fractionation step or series of fractionation steps as will be understood by those skilled in the art.

After admixture of liquid alpha-pinene with sodium by any of the foregoing techniques, the admixture is maintained at a temperature between about room temperature (70° F. to 80° F.) and a higher temperature below which related isomerization and disproportionation products are not formed appreciably. Normally the temperature of pretreatment ranges from about room temperature to about 300° C. The amount of sodium used and the length of time of pretreatment depend, of course, on the amount of catalyst poisoner to be inactivated. This can be established by simple trial and error. As a rule, however, the amount of sodium to be used ranges from about 0.1 percent to about 5.0 percent by weight of the alpha-pinene supply, and the length of treatment of liquid pinene extends for about 0.1 hour to 8 hours. Thereafter, the treated alpha-pinene supply may be subjected to the isomerization process to form beta-pinene.

When the alpha-pinene is in the vapor phase and sodium on an inert solid medium is employed, the vapors are passed over or through a bed composed of the solid medium and the sodium supported thereon. Substantially the same amount of sodium should be present per unit volume of liquid alpha-pinene treated as for that previously stated, but the time of exposure is considerably shortened, for example, to the order of 0.1 to 600 seconds. If dispersion of sodium is used, the vaporized alpha-pinene is bubbled through the former, substantially at the concentrations, times and temperatures given for a pretreatment of liquid alpha-pinene with a dispersion of sodium in a liquid inert carrier.

The use of sodium as a pretreating agent is further unique in that the unused sodium may also act as the isomerization catalyst. Enhanced results are especially obtained when the sodium is in the form of extended surface area. For instance, alpha-pinene in either vapor or liquid phase can be passed over or through a fixed bed of an inert medium, usually in particulate form, carrying sodium of extended surface area initially under conditions to pretreat or sweeten the alpha-pinene. The treated alpha-pinene can subsequently be recirculated over or through the fixed bed at the same or changed conditions as may be needed to effect isomerization of the alpha-pinene in accordance with the present invention.

Similarly, alpha-pinene in a vapor phase can be bubbled through a liquid dispersion of sodium, firstly, under conditions effective to pretreat the alpha-pinene and, secondly, again bubbled through the dispersion under conditions effective to isomerize the alpha-pinene to beta-pinene. Still further, the alpha-pinene can be admixed with a liquid dispersion of sodium, and the resulting liquid admixture treated under conditions effective to pretreat the alpha-pinene; and subsequently the same liquid admixture can be treated under conditions conducive to isomerize the alpha-pipene. In general, all of the foregoing conditions are the same as those previously described in connection with each of such described functions individually.

In another pretreating operation of the present invention, the alpha-pipene supply is treated with an alkali metal hypochlorite, such as potassium, lithium, or sodium hypochlorite, normally present in the form of an aqueous solution. Although the required strength of the solution depends, of course, on the amount of catalyst poisoner present in the alpha-pinene, in most instances the aqueous solution comprises about 5 percent to about 20 percent by weight of the alkali metal hypochlorite. The alpha-pinene and alkali metal hypochlorite solution are merely mixed together and allowed to remain in contact, preferably with stirring, for a sufficient time to permit the metal hypochlorite to complete its function. The operation is carried out at a temperature within the range of about room temperature to about 100° C.

It has further been found that the period of time of pretreatment with an alkali metal hypochlorite can be markedly reduced if an emulsifier for the alpha-pinene and hypochlorite solution is present. In one instance the treating time was cut from over 100 hours to 1 hour or less. This was accomplished by mixing three volumes of alpha-pinene with one volume of a 13 percent aqueous solution of sodium hypochlorite, adding as an emulsifier 0.1 percent aqueous solution of an alkylaryl polyether alcohol. The sulfonates and sulfates of such alcohols and particularly the non-ionic alcohols and salts thereof may also be used, the non-ionic emulsifiers being preferred. Compounds of these classes are sold under the trademark "Triton," such as "Triton X–100." Other emulsifiers which may be used include non-ionic emulsifiers, anionic emulsifiers, and mixtures thereof.

Among the useful non-ionic emulsifiers are:

Butyl phenol monoether of a polyethylene glycol
Alkyl aryl polyether alcohol
Dihexyl ester of sodium sulfosuccinic acid
Polyethylene glycol p-iso octyl phenyl ether
Polyoxyethylene sorbitan monooleate
Sorbitan monopalmitate
Sorbitan monostearate
Sorbitan monooleate
Ethylene oxide condensate of octyl phenol Among the useful anionic emulsifiers are:

Sodium dodecyl benzene sulfonate
Alkyl benzene sodium sulfonate
Sodium lauryl sulfate
Sodium lauryl sulfoacetate
Alkyl naphthalene sulfonate The emulsifier promotes intimate contact of the alpha-pinene and aqueous layers of metal hypochlorite with only moderate stirring. The advantages of an emulsifier can be further enhanced by using a weak emulsification, that is, one which is easily "broken," thereby further shortening the time of the pretreatment step. A relatively weak emulsion can be obtained either by using an emulsifier which is inherently weak or by using a limited quantity of an emulsifier. In general, for purposes of the present invention, a weak emulsion is one which breaks or separates in less than 30 minutes while standing at room temperature and at atmospheric pressure.

At the end of the alkali metal hypochlorite pretreatment, the alpha-pinene may contain chlorides which can be detrimental to the isomerization step. All or a sufficient amount of these chlorides can be removed by distilling the hypochlorite-treated pinene and selecting a medial fraction between the first distillate and the residue of the fractionation for further processing. For example, the first ten percent of distillate and a ten percent residue may be discarded, the medial fraction being used.

Alternatively, in lieu of distillation or fractionation, the hypochlorite-treated alpha-pinene may be further contacted with an aqueous solution (for example, about 50 percent) of an alkali metal hydroxide and one or more equal volumes of a water wash at reflux temperatures to produce a satisfactory chloride-free product for isomerization. Normally, these two wash steps are carried out in the order named. If the chlorides which are present are not undesirable, the wash with an alkali metal hydroxide can be omitted, and a series (for example, about four) of individual, sequential washes used instead, each wash being with a volume of water equal to that of the pinene supply and at atmospheric reflux temperatures.

As further pretreating agents, zinc and zinc oxide have also been found useful. These materials can be used on an inert support in an amount of about 0.5 percent to about 5 percent by weight of the support. The inert supports comprise any of these materials described as serving for the support for sodium as a pretreating agent. Or zinc and/or zinc oxide may be directly admixed as a powder or dust with liquid alpha-pinene, that is, without any inert support. The conditions of pretreatment includes a temperature within the range from about room temperature to a higher temperature below which related isomerization and disproportionation products are not formed, for example, reflux temperatures; and a period of time of about 0.1 hour to 8 hours.

A further pretreating technique of the present invention involves treating liquid alpha-pinene with hydrogen in the presence of a metal from Group VIII of the Periodic Table of the Elements having an atomic number from 28 to 78. Such metals include ruthenium, palladium, iridium, nickel, osmium, rhodium, and platinum. The metal is preferably precipitated on an inert, or alkaline support. Any of those materials previously disclosed as an inert support can be used. Hydrogen gas is bubbled through the alpha-pinene while it contains particles of the metal which preferably have a surface area of about 100 to 300 square meters per gram, as determined, for example, by the gas absorption method of Emmett and Teller. The action of the rising, bubbling gas tends to keep the metal particles fairly uniformly distributed throughout the pinene supply. With hydrogen being bubbled at a rate of about 1 ml. to about 10 ml. per minute through an alpha-pinene supply of about 1000 cubic centimeters, the pretreatment may last from about 2 hours to about 30 hours.

After any of the foregoing pretreatment steps is completed, the treated alpha-pinene may be subjected to isomerization as described in the parent Patent No. 3,278,-623. For the substantially non-destructive isomerization of alpha-pinene to beta-pinene it is essential to maintain the reaction mixture and catalyst (and a catalyst support if one is used) non-acidic in any sense of the word, either where considered as a conventional acid of a conventionally measurable acidity by titration or the like, a Lewis acid, or a material which reacts with a Hammett indicator to give an acid indication. Thus, pure alumina, for example, from aluminum hydroxide or aluminum isopropylate, is a suitable support; whereas silica gel, which reacts as acid to neutral red Hammett indicator, is deleterious as are clays, silica-alumina, and other well-known petroleum cracking catalysts. Thus, the reaction environment should be neutral to basic when measured with neutral red Hammett indicator. Acidic material inherent in or sorbed on the catalyst on the catalyst support is quite detrimental.

Patent No. 3,278,623 describes and illustrates various systems for isomerizing the alpha-pinene. As there disclosed, the apparatus employed may vary from a sealed steel bomb for the alpha-pinene supply and catalyst to an atmospheric fractionational distillation process wherein a concentration of the higher boiling beta-pinene (as compared to alpha-pinene) gradually accumulates in collection vessels. The isomerization process can be either continuous or discontinuous, and in either case at superatmospheric, atmospheric, or moderately subatmospheric pressures. The alpha-pinene supply can also be either in the liquid or vapor phase during isomerization.

In room temperature operation with the catalysts of the present application, the equilibrium between alpha and beta-pinene that is approached in a practical operating period is about three percent beta-pinene; at an operating temperature of about 150° C., it is about four percent; and at 220° C., it is about 5.5 to 7 percent beta-pinene. For practical operating purposes, it is preferred to operate between about 150° C. and about 225° C. to obtain enhanced beta-pinene concentration in the isomerizate. Above this temperature the formation of thermal isomerization and degradation products (by-products) appears to be accelerated when appreciable contact times are permitted, for example, a minute or more, between the catalyst and the pinene supply.

In a flow operation the average contact time is computed as the quotient in consistent units of the pinene capacity of the catalytic reaction zone divided by the volumetric input of pinene supply thereto per unit time corrected to average temperature and pressure conditions in the catalytic reaction zone. Successful isomerization procedures have been carried out using contact times as low as a few tenths of a second upwards to many hours. For vapor phase operation and maximum use of a given volume of catalyst, it is preferred to use contact times between about 0.1 and about 1 second, or longer. In liquid phase operations, a contact time of about 0.5–2 minutes for efficiency and economy is preferred. The only criticality noted with respect to the length of contact time is the desirability to avoid prolonged times (over 60 seconds) in operations at a temperature above about 225° C. for suppressing by-product formation.

A recommended recovery technique is that of fractional distillation at a maximum temperature not above 200° C. and preferably about 125° C. to suppress thermal formation of by-products in the distillation. Other conventional processes can be used in separating alpha from beta-pinene in the isomerzate as disclosed in Patent No. 3,278,623.

The following examples are intended only to illustrate the invention and should not be construed in any way as limiting the disclosure. One skilled in the art of terpene chemical operations will recognize how important is is to suppress formation of related isomerization products such as menthadienes (limonene chiefly), camphene, cymene, and alloocimene because they boil relatively close to beta-pinene and are comparatively difficult to separate therefrom efficiently.

The alpha-pinene supply used in all cases was recovered from sulfate turpentine, the technical grade containing 98 percent alpha-pinene and about 2 percent camphene as an indigenous impurity. Where a purer grade of alpha-pinene was used, containing less than about 1 percent extraneous materials, the pinene supply was considered "pure" for all practical purposes. In all cases quantitative analysis of the feed and output was done by vapor phase chromatography using as a base "Carbowax 20M," the trademark for an ethylene oxide condensation product having average molecular weight of about 20,000. All temperatures are given in degrees Centigrade, and all percentages are weight percentages unless otherwise expressly indicated.

*Example 1*

An amount of 2000 ml. of alpha-pinene obtained from sulfate turpentine was mixed with about 300 grams of an inert medium of sodium carbonate carrying a film of elemental sodium. The sodium constituted about ten percent by weight of the inert support. The mixture was stirred at about 180 to 200° for about 30 minutes at a superatmospheric pressure of about 50 to about 300 millimeters of mercury.

Subsequently, this sodium-treated alpha-pinene supply was isomerized in a fractional distillation unit wherein one vessel which received the condensed distillate was charged with one percent of 0.5 percent palladium on alumina as the catalyst. The useful life of this catalyst was prolonged as compared to its life when the alpha-pinene was not pretreated in accordance with this example.

*Example 2*

A pretreatment was carried out like the pretreatment of Example 1, except that the alpha-pinene supply was treated with a 13 percent aqueous solution of sodium hypochlorite at about 30° for about 30 minutes. The hypochlorite solution contained 0.1 percent of an alkylarylpolyether alcohol as an emulsifier. If desired, chlorides could be stripped from the treated alpha-pinene by fractionation or by treatment with an alkali metal hydroxide followed by a hot water wash.

The treated alpha-pinene was then processed in accordance with a continuous method wherein the heated alpha-pinene was passed through a catalyst chamber containing Raney nickel, activated prior to use with gaseous hydrogen for about one hour at 100°. The catalyst chamber was contained in a molten salt bath of controlled temperature.

*Example 3*

This example illustrates the use of sodium as both a pretreating and catalytic agent. A supply of alpha-pinene containing catalyst poisoners was volatilized at about 170° and passed at the rate of three milliliters per minute over an inert solid carrier comprising 300 grams of sodium carbonate carrying 10 grams of sodium as a film. The alpha-pinene was "sweetened" and simultaneously converted into the alpha-beta-pinene equilibrium mixture with a minimum of production of such by-products as limonene and cymene. Isomerization continued until about 2,000 milliliters of alpha-pinene had been passed over the catalyst. At this point, the beta-pinene formation began to diminish, and after 2,300 milliliters had been passed over the catalyst, no beta-pinene was formed.

Condensation of the isomerized vapor after about 2,000 milliliters of alpha-pinene had been passed over the catalyst analyzed as follows: 93 percent alpha-pinene, 4.1 percent beta-pinene, and 2.8 percent camphene.

If desired, it is within the contemplation of the present invention to use sequentially a series of catalyst in order to enhance the recovery of beta-pinene. In this example, the sodium-treated alpha-pinene, having a content of 4.1 percent beta-pinene, was next refluxed with a catalyst of one percent of 0.5 percent palladium on alumina in the apparatus described in Example 1. After about 45 hours of operation, the collecting kettle contained 19 percent beta-pinene, 1.4 percent limonene, 3.0 percent camphene, and 0.7 percent cymene, the balance being substantially all alpha-pinene.

*Example 4*

A mixture was prepared containing 200 grams of an alpha-pinene supply and a dispersion of 35 percent of sodium particles in light naphtha having a boiling range from about 103° to 148°. The particles had an average size of about 10 microns. After a pretreatment of about 15 minutes, the admixture was then heated to 200° and maintained under sufficient pressure to preserve the liquid phase. The excess sodium present, that is, the excess over that needed to pretreat the alpha-pinene, caused equilibration of the alpha and beta-pinene from which the beta-pinene was recovered. Any of the techniques previously described for this separation could be used.

Temperatures above 200° are also operable within the physical limitations of the apparatus used.

*Example 5*

Hydrogen gas was bubbled at the rate of 5 ml. per minute through one liter of sulfate turpentine for 25 hours at a temperature of atmospheric reflux. The turpentine contained 1 percent of a catalyst comprising 0.5 percent of palladium on alumina. Although no hydrogen sulfide gas was released, this pretreatment deodorized the sulfate turpentine to an odor more characteristic of that of gum turpentine. Even though a feed of hydrogen for 25 hours was employed to enhance recovery of beta-pinene, a period of as little as four hours has also been found useful. The treated sulfate turpentine was then isomerized by a one percent catalyst of 0.5 percent palladium on alumina to produce beta-pinene.

*Example 6*

A supply of 200 grams of alpha-pinene was diluted 25 percent by water, and 20 grams of zinc oxide were added. After 4 hours of atmospheric reflux, the odor of the alpha-pinene was improved. The treated alpha-pinene was then isomerized using one percent catalyst of 0.5 percent palladium on alumina. The yield of beta-pinene was in excess of 4.5 percent of the isomerizate.

When the same alpha-pinene supply was directly subjected to isomerization using the same catalyst and operating conditions but without a pretreatment of zinc oxide, the isomerizate contained a yield of beta-pinene substantially below 4.5 percent, thereby illustrating the advantages of the zinc oxide pretreatment.

The use of zinc dust in place of zinc oxide gave comparable results.

While the foregoing described several embodiments of the present invention, it is understood that the invention may be practiced in still other forms within the scope of the following claims.

I claim:
1. A process for the substantial non-destructive isomerization of sour alpha-pinene to beta-pinene, which comprises:
   sweetening a sour alpha-pinene supply at a temperature between about room temperature and about 100° C. with an aqueous solution of an alkali metal hypochlorite in the presence of a weak emulsification of said alpha-pinene supply and hypochlorite,
   thereafter breaking the emulsion and subsequently recovering and treating the alpha-pinene portion substantially to remove therefrom catalyst-poisoning chlorides,
   and finally contacting the alpha-pinene supply with a transitory hydrogen acceptor catalyst under neutral to basic conditions and in a reaction zone maintained between about room temperature and about 300° C. to effect isomerization to alpha-pinene to beta-pinene.

2. The process of claim 1 wherein the step of sweetening the sour alpha-pinene supply with said alkali metal hypochlorite takes place for about 0.1 hour to about 8 hours.

3. The process of claim 1 wherein the step of treating said alpha-pinene portion substantially to remove the catalyst-poisoning chlorides comprises fractionating said recovered alpha-pinene portion, and selecting a medial fraction between the first distillate and the residue of the fractionation for the isomerization step.

4. The process of claim 1 wherein the step of treating said alpha-pinene portion substantially to remove the catalyst-poisoning chlorides comprises refluxing the recovered alpha-pinene portion with an alkali metal hydroxide and washing said alpha-pinene portion with water.

5. The process of claim 1 wherein the step of treating said alpha-pinene portion substantially to remove the catalyst-poisoning chlorides comprises washing said alpha-pinene portion with water.

References Cited

UNITED STATES PATENTS

| | | | |
|---|---|---|---|
| 2,772,211 | 11/1956 | Hawkes et al. | 208—208 |
| 2,866,746 | 12/1958 | Love | 208—88 |
| 2,951,888 | 9/1960 | Carr | 208—89 |

DELBERT E. GANTZ, *Primary Examiner.*

G. E. SCHMITKONS, *Assistant Examiner.*